United States Patent
Ivler et al.

(10) Patent No.: US 6,743,024 B1
(45) Date of Patent: Jun. 1, 2004

(54) QUESTION-RESPONSE PROCESSING BASED ON MISAPPLICATION OF PRIMITIVES

(76) Inventors: John Mandel Ivler, 11071 Bunker Hill Dr., Los Alamitos, CA (US) 90720; Frank Rubin, 16744, Pacific Palisades, CA (US)

(*) Notice: Subject to any disclaimer, the term of this patent is extended or adjusted under 35 U.S.C. 154(b) by 33 days.

(21) Appl. No.: 09/772,496

(22) Filed: Jan. 29, 2001

(51) Int. Cl.⁷ .............................................. G09B 3/00
(52) U.S. Cl. .................... 434/322; 434/118; 434/350
(58) Field of Search ............................. 434/322, 118, 434/350; 706/12–15, 45, 62

(56) References Cited

U.S. PATENT DOCUMENTS

| | | | |
|---|---|---|---|
| 4,895,518 A | * 1/1990 | Arnold et al. ............... 434/118 |
| 5,441,415 A | 8/1995 | Lee et al. |
| 5,836,771 A | 11/1998 | Ho et al. |
| RE36,028 E | 1/1999 | Deesen et al. |
| 5,870,731 A | 2/1999 | Trif et al. |
| 5,885,087 A | * 3/1999 | Thomas ...................... 434/373 |
| 5,907,831 A | * 5/1999 | Lotvin et al. .................. 705/14 |
| 5,934,909 A | 8/1999 | Ho et al. |
| 5,934,910 A | 8/1999 | Ho et al. |
| 5,987,443 A | 11/1999 | Nichols et al. |
| 6,018,617 A | * 1/2000 | Sweitzer et al. ........... 358/1.15 |
| 6,029,043 A | 2/2000 | Ho et al. |
| 6,086,382 A | 7/2000 | Thomas |
| 6,112,049 A | * 8/2000 | Sonnenfeld ................. 434/350 |
| 6,118,973 A | 9/2000 | Ho et al. |
| 6,315,572 B1 | * 11/2001 | Owens et al. ............... 434/322 |
| 6,386,883 B2 | * 5/2002 | Siefert ......................... 434/322 |
| 6,419,496 B1 | * 7/2002 | Vaughan, Jr. ............... 434/322 |
| 2002/0052860 A1 | * 5/2002 | Geshwind ..................... 706/62 |
| 2002/0160347 A1 | * 10/2002 | Wallace et al. ............. 434/322 |

* cited by examiner

Primary Examiner—Teresa Walberg
Assistant Examiner—Cameron Saadat
(74) Attorney, Agent, or Firm—Foley & Lardner

(57) ABSTRACT

A system and method of processing responses to questions presented to an individual. Testing seeks to define what primitive components of the educational program that the individual doesn't understand. Using multiple-choice questions where incorrect answers are derived from failing to process primitives to the problem correctly, the system ensures that every answer to every question defines the problem area for the individual by weighting those primitives against a base threshold when answered incorrectly. Once the threshold has been passed, the system adapts to test the primitive that has failed to be understood. Questions are generated that test to see if the individual understands the theory and concepts associated to the initial primitives' primitive components. The test is complete when there are no further primitives to be examined. Primitive thresholds can adapt based on individual responses as well as individual psychographic and demographic data the individual has supplied to the system, or that was determined from aggregate data. The conclusion of the testing process is a guide to the primitives where individuals have an understanding, where they have some potential problems with the primitive in either theory or execution and where they have problems with the primitives theory or application.

40 Claims, 12 Drawing Sheets

QUESTION-RESPONSE PROCESSING BASED ON MISAPPLICATION OF PRIMITIVES

BACKGROUND

1. Field of the Invention

The present invention relates to the field of testing. In particular, it relates to a system and method that questions an individual and accepts a response from the individual, wherein the individual is tested through a series of questions and answers to determine what the individual does not know.

2. Description of Related Art

Conventional methods of testing seek to define the parameters of what an individual knows. These methods typically use either a database of questions, or algorithms, to generate proper answers to known or generated problems. The problems are then presented to an individual being tested to determine if the individual knows what the proper response is.

In testing methods where the possible answers are presented in a multiple-choice format, a correct answer or a "none of the above" response will typically be provided to an individual being tested along with any number of incorrect responses. These incorrect responses are generally generated from a random process or through accessing incorrect responses for the question being presented.

In a typical conventional testing method scenario, an individual being tested is presented with a question to be answered and several potential answers. The individual must then respond to the question by selecting one of the answers provided.

Typically, the answers provided do not reflect the misapplication of a primitive, or fundamental concept. Because of this, no meaningful information may be ascertained as to what the individual being tested doesn't understand. Thus, the typical conventional testing method, after receiving an incorrect response to a question, will not indicate what primitive was not understood, so there is no way to know if primitive concepts were known or if the error was based on a mechanical problem by the individual being tested.

SUMMARY OF THE INVENTION

The present invention provides methods and a system for processing a series of query-responses between an individual and a system. A goal of this process is not to determine what information the user knows and understands, but to define the areas where the user doesn't understand concepts. The system may adjust questions during a test process to locate the lowest level primitive components that the individual being tested doesn't understand.

In an embodiment of the system, an individual being tested may be tested to see if a problem is understood by the individual and if the individual can respond correctly to it through multi-choice answers. Also, error choices may be generated by algorithms designed to create wrong answers that would be "correct responses" if the user misapplies the primitive concepts.

Another embodiment of the invention is directed toward a method for processing questions and responses, comprising the steps of entering data regarding an individual into a system; creating a question based on the data; creating a plurality of answers related to the question; presenting the questions and the plurality of answers to the individual; and detecting a response from the individual. In this embodiment, some of the plurality of answers may be incorrect answers based on misapplication of a primitive, while one of the plurality of answers is a correct answer to the question. Also, the system may create and present further questions and pluralities of answers to the individual based on the response from the individual. In addition, a counter may be incremented if an incorrect answer is chosen by the individual, and an action may be taken if the counter exceeds a threshold and another action may be taken if the counter does not exceed the threshold. The system may also support branding and authorization.

In this embodiment, the method may further comprise the step of determining from the responses from the individual what the individual does not know, and advertising information responsive to what the individual does not know may be presented to the individual.

Yet another embodiment of the invention is directed toward a system for processing questions and responses comprising a test establishment engine; a question creation engine, wherein questions are created using information determined by the test establishment engine; an answer creation engine, wherein a plurality of answers are created in relation to the questions; a presentation engine, wherein the questions and the plurality of answers are presented to an individual; and a response detection engine, wherein responses from the individual to the questions are detected. Also, some of the plurality of answers may be incorrect answers based on misapplication of a primitive. The system may create and present further questions and pluralities of answers to the individual based on the response from the individual.

The system may include a counter which may be incremented if an incorrect answer is chosen by the individual. Further, an action may be taken if the counter exceeds a threshold and another action may be taken if the counter does not exceed the threshold. The system may further comprise a determination engine, wherein the system determines from the responses from the individual what the individual does not know and advertising information responsive to what the individual does not know may be presented to the individual. The system may also support branding and authorization.

In all preferred embodiments of the invention, embodiments of the invention may be implemented in software residing on a computer system, and the computer system may be networked.

BRIEF DESCRIPTION OF THE DRAWINGS

These and other features, aspects, and advantages of the present invention will become better understood when viewed in light of the accompanying drawings where.

DETAILED DESCRIPTION

Figure 1:
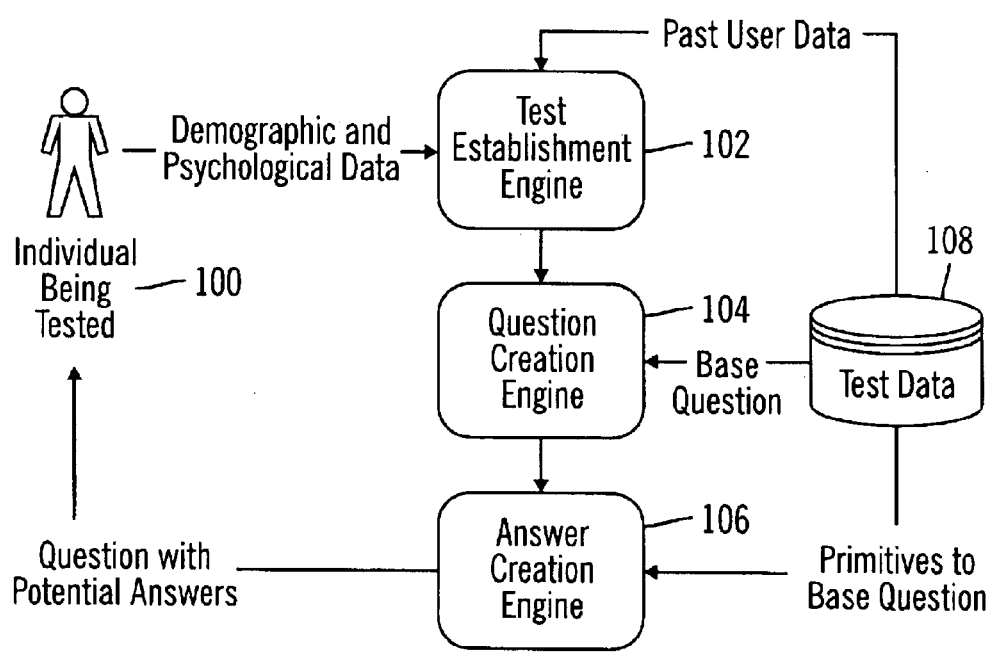
FIG. 1 is a diagram of a system according to an embodiment of the present invention.

Learning is a hierarchical process. Knowledge builds on itself using as building blocks prior items of knowledge. These items are called primitives. There are, in all systems of learning, base primitives or rules, i.e., fundamental concepts that are required to be understood before other primitives can be layered above them. One embodiment of the system of the present invention builds a hierarchical tree that shows any further learning from a base primitive as being built on an understanding of more than one primitive. These hierarchical levels are not limited in the number of levels it takes to go from any one concept to the base primitives that make up the concept.

Every problem, unless the problem is a base primitive, has primitive components that make up the problem. A primitive may be a basic principle or fundamental concept used in answering a question or solving a problem. Primitives may be defined in advance for a particular question or problem or for a type of question or problem. For example, addition questions or problems may require the use of primitives, basic principles of addition of two simple numbers and, possibly, basic principles of carrying. For example, the problem 1+1 is a base primitive problem. The problem 372+239 is not a base primitive as it requires that you understand two primitives. The first is the base primitive of addition, and the second is the base primitive of carrying. As the problem gets complex the number of primitives associated to the problem increases.

The primitives associated with a question or problem depends on the nature of the question or problem and the complexity of the question or problem. A simple addition question may have one or more primitives, while a complex addition problem may have the same primitives as the simple addition problem, plus more primitives. A division or multiplication question or problem may have different primitives. Questions or problems associated with grammar, spelling, and other subjects may have yet different primitives. If an individual is testing under a system that understands the primitive, then the test can be designed to make a common error in the primitive component and present that error as a possible solution to the multiple-choice selection. For example, an individual could be presented with the problem $3\frac{1}{4}-1\frac{1}{3}$. In computing this problem, the individual may make an error in borrowing. In this example, the individual may be able to arrive at $3\frac{3}{12}-1\frac{4}{12}$, but when borrowing from the 3, the individual may transform $2\frac{13}{12}$ rather than $2\frac{15}{12}$ because the borrowed unit was borrowed at $\frac{10}{12}$ verses the correct $\frac{12}{12}$'s. The system, knowing that this is a potential problem based on the primitives associated to the initial problem, may offer the incorrect result of $1\frac{9}{12}$ (or in reduced form $1\frac{3}{4}$), which would be one of two possible answers that could have been generated by making the primitive error that the individual being tested made (a second less likely error based on the individual's initial error would be $2\frac{1}{12}$ arrived at by subtracting 1 from 3 and $\frac{1}{4}$ from $\frac{1}{3}$).

Once this possible error has been detected by the system the primitive associated with the error selected may have a weighted value added to the primitives counter. Throughout the testing process the system may see if any primitive has exceeded a threshold value for that primitive based on both initial values that were created in the system as well as process adjustments to those values that the system may make through adaptive mechanisms built into the system.

An overview of a system according to a preferred embodiment of the present invention is shown in FIG. 1. In this embodiment, an individual being tested 100 enters data into a test establishment engine 102, which may also use data from a database 108 of past user data, so that a testing topic may be established by the system using the data. Once an area of testing has been established, a question creation engine 104, which also may use data from the database 108, creates questions related to the established topic to be presented to the individual being tested 100. After creation of a question an answer creation engine 106 creates a selection of answers to the question. The question and the answers are then presented to the individual being tested 100.

Figure 2:
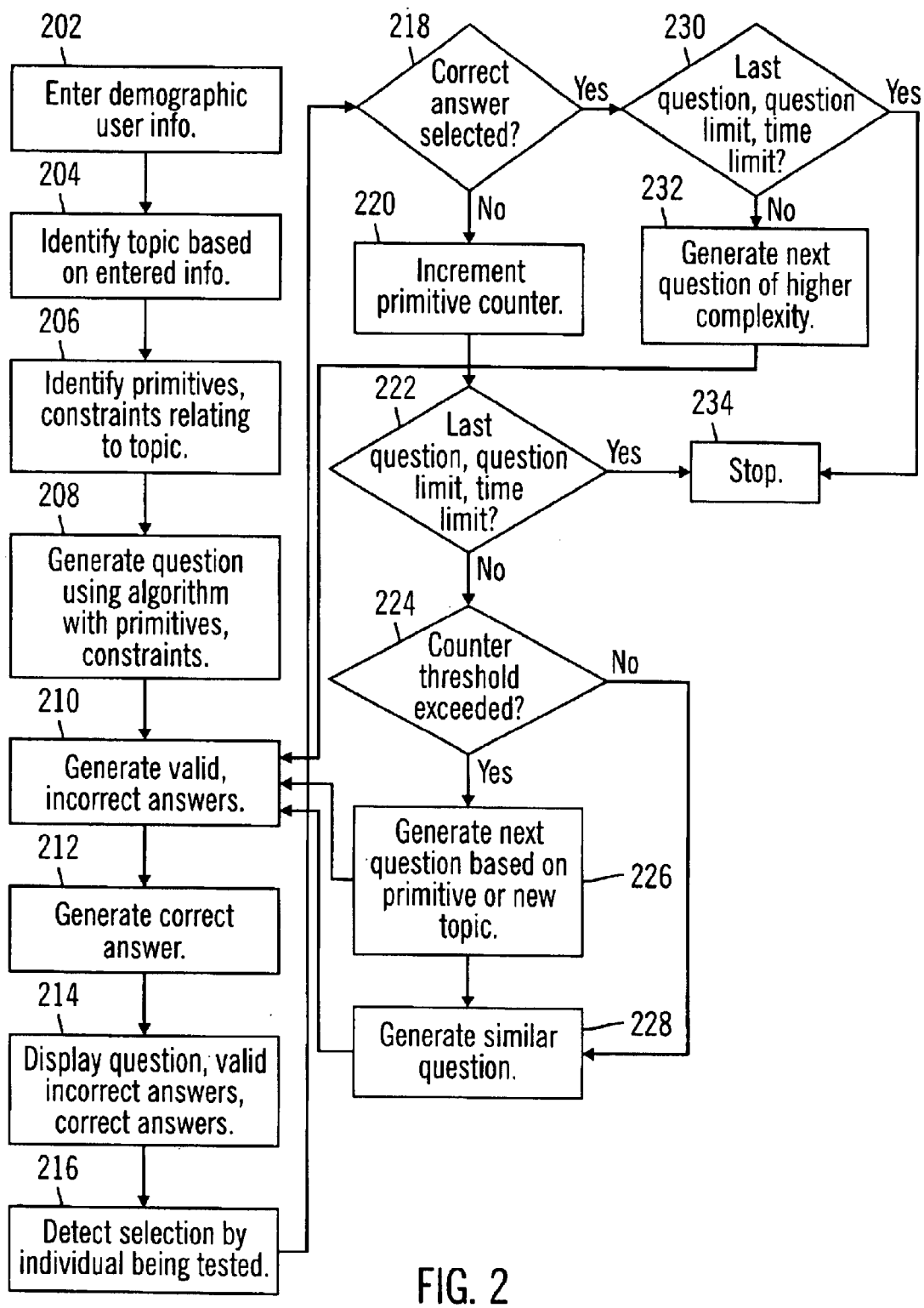
FIG. 2 is a flow diagram of a process according to an embodiment of the present invention.

A flowchart of a method according to a preferred embodiment of the present invention is shown in FIG. 2. At step 202, information regarding an individual being tested may be entered into the system. This information may include, but is not limited to, demographics and psychographics, such as grade level, attendance at public or private school, location of residence, and other information relevant to the individual. This information may be compiled and accumulated in a database or look-up table. Over time, as testing occurs, information relating to answers provided by individuals being tested may also be included in a database or look-up table. The system may be designed such that the inclusion of information relating to answers is updated in a database or look-up table automatically.

Using this information, step 204 may identify a topic for testing. Topics are identified by analyzing the information that has been entered into the system and determining, based on the analysis, subject areas that tend to be problematic for the particular individual being tested. Topics may include, but are not limited to, broad areas such as mathematics, physics, grammar, or reading comprehension. Topics may be more specific, within an area, such as, but not limited to, addition, subtraction; multiplication, thermodynamics, conjugation of verbs, or the like. Initially, this analysis may be performed manually. However, as more and more individuals are tested and information relevant to each individual is stored in the system, this analysis may be automated by the system. For example, the system may identify patterns in the information being stored, such as identifying a high percentage of missed answers to questions by individuals from a particular area. Alternatively, a topic may be selected from a pre-stored set of topics.

Each topic may comprise a plurality of question numbers. Further, each question number may be associated with an algorithm and constraints. For example, if an identified topic is addition without carrying, a suitable constraint may be that the sum of any two digits used for the question must be less than ten.

Step 206 may identify primitives, or fundamental concepts, associated with each question number. Questions and primitives may be stored in a look-up table, as follows:

| Question # | Primitive |
|---|---|
| Q1: algorithm & constraint | $P_1, P_2, P_3, \ldots, P_n$ |
| Q2: algorithm & constraint | $P_1, P_2, P_3, \ldots, P_n$ |
| Q3: algorithm & constraint | $P_1, P_2, P_3, \ldots, P_n$ |
| . | . |
| . | . |
| . | . |

Once a topic, question number, and primitives have been identified, step 208 may generate a question using an algorithm and constraints associated with the question number and the identified primitives. In a preferred embodiment, the algorithm is pre-determined and coded into the system. Any variables the algorithm may require may be randomly generated by the system using standard random number generator techniques that are well-known in the art. Alternatively, a question may be selected from a pre-stored set of questions. For example, questions may be stored in a database or look-up table that associates a question to the information entered by the individual being tested at step 202.

Once a question has been generated, step 210 may generate valid, incorrect answers for the question. These valid, incorrect answers may be the result of misapplication of a primitive or the application of known "careless" (misapplication of known and mastered primitives) behavior. For example, one or more primitives associated with each question number may be chosen and misapplied, resulting in an incorrect answer. A sixth step 212 may generate a correct answer for the question.

A question, a correct answer and valid, incorrect answers may be displayed at step 214. In a preferred embodiment, a CRT is used as a display device. Alternatively, a liquid crystal display (LCD) may be used as may any display device suitable for presenting the information in a desired fashion.

As an example of what may be displayed, assume that an identified topic is addition with carrying. A question that may be generated by the system under this topic is $1\frac{1}{2} + 1\frac{3}{4}$.

This question may be taken from a database or look-up table or may be generated automatically by the system using an algorithm coded into the system.

Assume that this question is of the form n1 n3/n4+n2 n5/n6, the primitives identified with this question may be Addition—n1+n2

Carrying—If n3/n4+n5/n6>1, add 1 to the sum of n1, n2

This question may be displayed along with the following correct answer $3\frac{1}{4}$.

In addition, the following valid, incorrect answers may also be displayed:

| 2 4/6, | 3, | 2 14/4 |
|---|---|---|

Thus, the entire question and selection of answers may be displayed as follows:

| Q: | $1\frac{1}{2} + 1\frac{3}{4}$ | | | |
|---|---|---|---|---|
| A: | a) $3\frac{1}{4}$ | b) 2 4/6 | c) 3 | d) 2 14/4 |

Subsequent to seeing the displayed question and possible answers, an individual being tested may choose one of the answers. In step 216, the selection chosen by the individual being tested is detected. In a preferred embodiment, detection is performed automatically by the system. For example, if the system is implemented on a computer and an individual being tested selects an answer by entering a number on a keypad, the computer may automatically read the keypad to detect the answer selected.

Continuing to refer to FIG. 2, step 218 may require the system to make a decision. If a correct answer was chosen by the individual being tested, the system may then determine whether any test-terminating conditions have been met at step 230, including, but not limited to, whether a last question stored in a look-up table for a particular topic has been reached, whether a pre-determined total number of questions has been reached, or whether a time limit for testing has been reached. In the event any of these test-terminating conditions have been met, testing may end at step 234. If none of the test-terminating conditions have been met, step 232 generates a next question of higher complexity in the identified topic, followed by generation of valid, incorrect answers and so on, repeating the process as shown in FIG. 2. Generally, a question of higher complexity may be generated by increasing the number of primitives and constraints associated with that question. For example, the question $7\frac{1}{4}-3\frac{3}{4}$ is more complex than the question 1+1 because the former requires that an individual being tested understand the primitives of subtraction and borrowing, whereas the latter is a base primitive and requires that an individual being tested understand addition only. Thus, the greater number of primitives or constraints in a question, the more complex the question.

If a correct answer was not chosen by the individual being tested, a primitive counter is incremented at step 220 such that the number of valid, incorrect answers chosen by the individual being tested is monitored. Subsequent to incrementing a primitive counter, the system checks for test-terminating conditions at step 222 as before. In the event any test-terminating conditions have been met, testing may end at step 234. However, if no test-terminating conditions have been met, the system may determine whether a threshold for the primitive counter has been exceeded at step 224. The threshold may be pre-determined initially and may be updated automatically by the system as data on various primitives is collected.

If the primitive counter threshold has been exceeded, at step 226 a next question may be generated based on a new primitive or a new topic altogether, followed by generation of valid, incorrect answers and so on, repeating the process as shown. If the primitive counter threshold has not been exceeded, a question similar to the previous question may be generated at step 228, possibly using the same primitives and algorithm but different constraints, followed by generation of valid, incorrect answers and so on, repeating the process as shown. The entire process may continue in this fashion until a test-terminating condition results in the process stopping at step 234.

In order to test for a primitive the concept must be defined and then the appropriate number of primitives to be tested for shall be selected. Each of these primitives will then be resolved against the test item so as to create an incorrect response by improper application of the primitive to the problem space. Primitive selection for which primitives are to be selected from all those available for the problem space may be influenced by prior questions and answers, individual demographic and psychographic data and analysis of aggregate data.

Each query-response sequence may record answers against the aggregate answer data and the weighted information for the individual being tested. This information may pass between the user and the system throughout the test process. If the system identifies an incorrect response, the system may take action to increase the weight given to various primitives when determining question selection. For example, if carrying in an addition problem is identified as a primitive and an individual being tested repeatedly forgets to carry in addition problems that require carrying, the system may record these errors and compare the total number of errors for this primitive with a threshold number. If the total number of errors meets or exceeds the threshold number, then the system may use that information in determining future question selection. In addition, if the information entered by an individual being tested at the beginning of a query-response sequence indicates a propensity for error regarding certain primitives, the threshold for that particular primitive may be adjusted accordingly.

Figure 3:
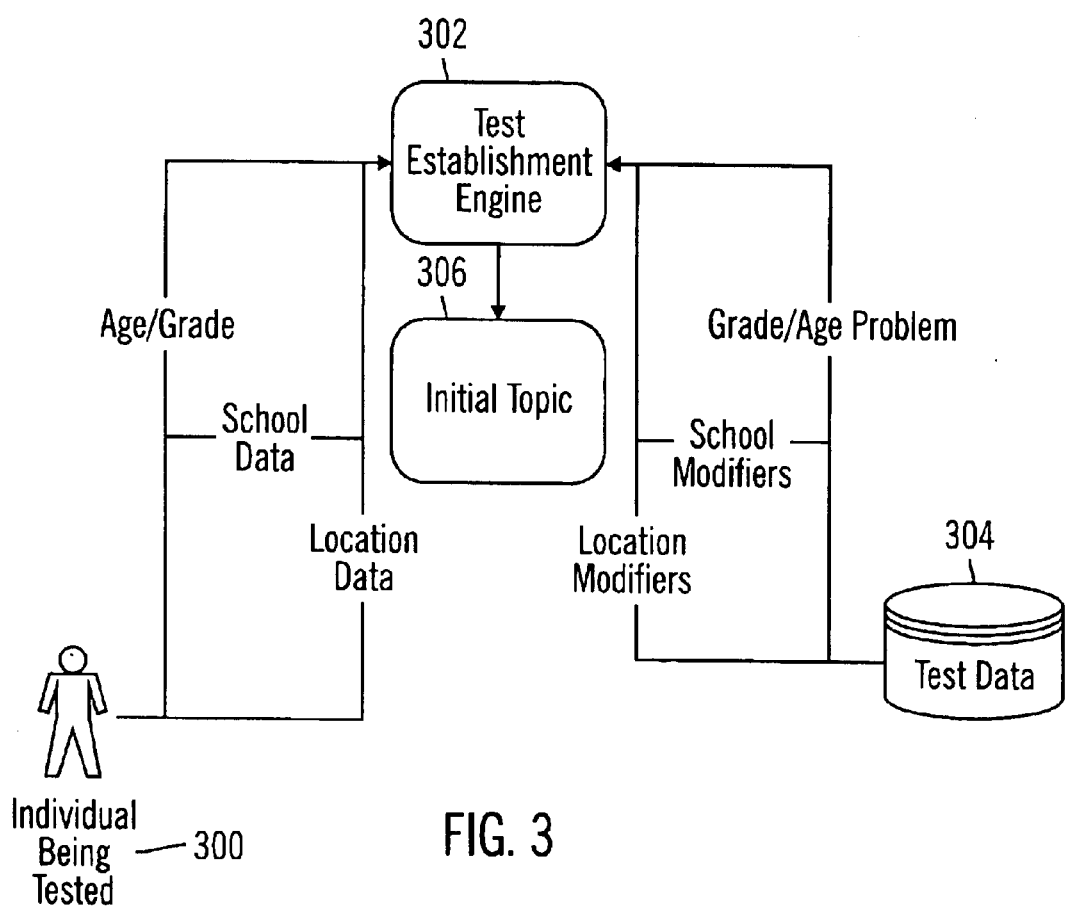
FIG. 3 is a diagram of a test establishment engine according to an embodiment of the present invention.

Details of a test establishment engine 302 according to an embodiment of the present invention are shown in FIG. 3. Initially, when an individual being tested 300 first uses the system, information is entered into the system by the individual being tested 300 so that the test establishment engine 302 may establish a starting topic from which to generate an initial question. The information entered by the individual being tested 300 may include, but is not limited to, demographic and psychographic data, such as age, grade level, type of education, such as public, private, or home school, and geographic data, such as city, state, country, and school district. Using prior established standards for these components of data, as well as information from the aggregate of all test data entered into and compiled by the system, an initial question 306 appropriate for the individual being tested 300 is generated.

Figure 4:
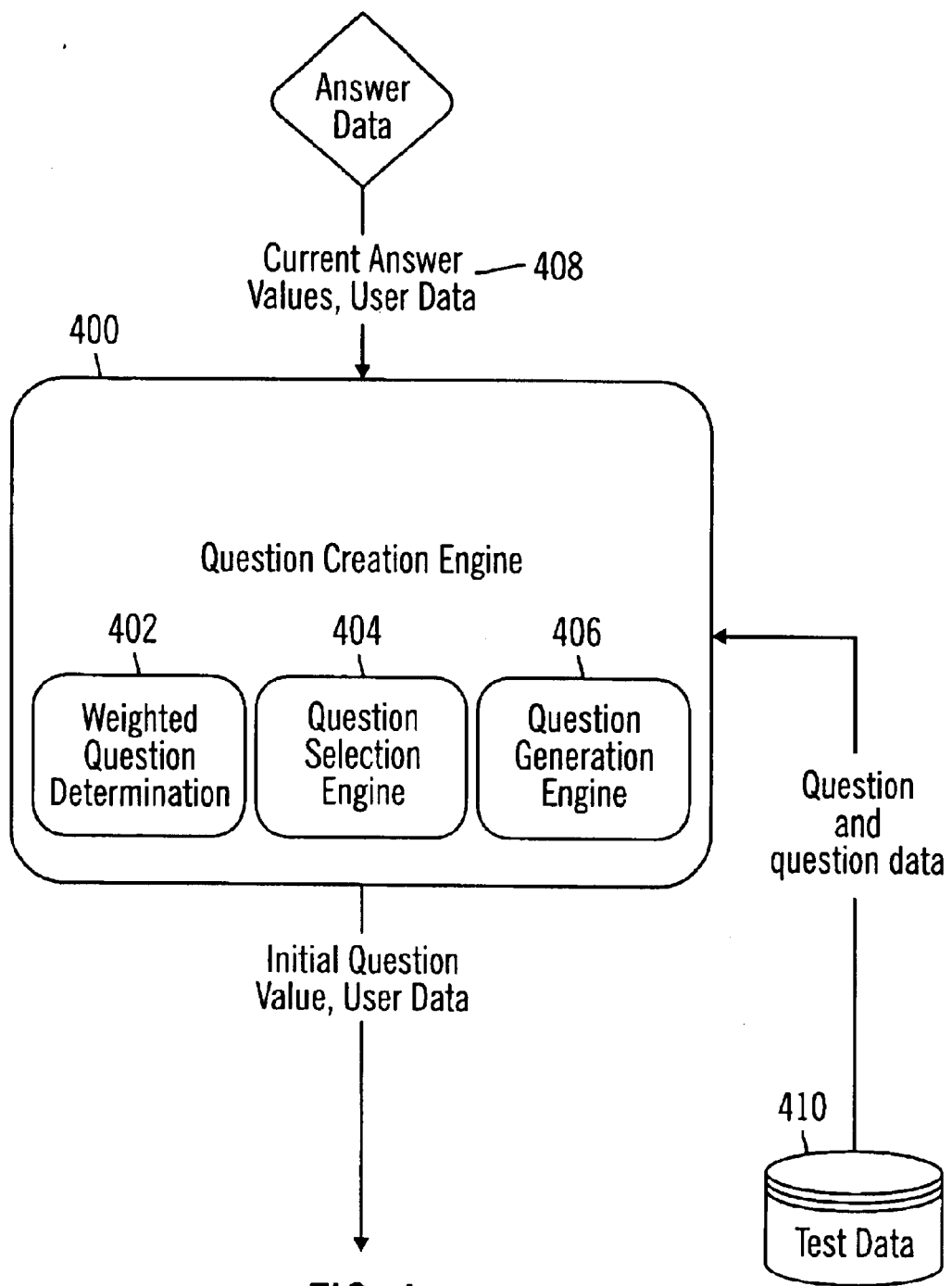
FIG. 4 is a diagram of a question creation engine according to an embodiment of the present invention.

Details of a question creation engine 400 according to an embodiment of the present invention are shown in FIG. 4. The question creation engine 400 may comprise three sub-engines that determine the question to be presented to an individual being tested. The first of these sub-engines may be a weighted question determination engine 402. A weighted question determination engine 402 may be used to determine a level, type and complexity of question to be asked to an individual being tested. For example, recalling steps 220 and 224 of FIG. 2, when an individual being tested answers a question incorrectly, a primitive threshold counter may be incremented by the system. The weighted question determination engine 402 may monitor this set of counters to determine whether a similar question should be asked or a question based on a new primitive or new topic should be asked. As another example, a set of counters for correctly answered questions may be maintained and monitored by the weighted question determination engine 402 to determine if more complex questions should be asked. Generally, a weighted question determination engine 402 may use current answer data 408 to define a level, type and complexity of question to be asked.

Once the weighted question determination engine 402 has defined a level, type and complexity of question to be asked, a question selection engine 404 may select an appropriate question from a question database. The question may contain necessary bounding constraints and other data 410 that will be used to define a problem. These constraints could be min and max numeric values in a math problem, or validation of the appropriateness of the vocabulary in a text based question. Once the question selection engine 404 has determined a question to be used, a question generation engine 406 may generate an actual question as well as a correct response to the question to be presented to an individual being tested.

The question generation engine 406 may use a formula to generate a question and an answer, as shown in the following example:

| Question: | 1–4 |
|---|---|
| Answer | −3 |

This question has one primitive associated with it, subtraction. Because there are no other primitives that may be considered a component of subtraction, this primitive is also a base primitive. Assuming that the minuend, "1" in this example, is represented by "n1" and the subtrahend, "4" in this example, is represented by "n2," this question may have the following constraints:

$n1 < n2$

The question may be initialized by a random choosing of n1 and n2 as follows, subject to the previously chosen constraints:

random(n1, n2)

Thus, the process for generating the question and correct answer, A, may be:

$A = n1 - n2$

A more complex example may be subtraction with borrowing. In the following example, there are multiple primitives that must be understood in order to solve the problem.

Question: 43−28

Answer: 15

As can be seen, an individual being tested must understand not only the base primitive of subtraction, but also the primitive of borrowing. This question may have the following constraints, where n1 represents the minuend and n2 represents the subtrahend:

$99 > n1 > n2$ $n1 > (n2 + 10)$ $n3 = mod(n1/10)$ $n4 = mod(n2/10)$ $n4 > n3$ where mod is an operator assigning the remainder of an argument to a variable.

The question may be initialized by a random choosing of n1 and n2 as follows, subject to the previously chosen constraints:

random(n1, n2).

Thus, the process for generating the question and correct answer, A, may be:

$A = n1 - n2$ (initial question)

$n5 = n1 - n4$ $n6 = n2 - n4$ $A = n5 - n6$ (final answer)

To generate a valid incorrect solution the system would use the following method:

$A = n1 - n2$ $n5 = n4 - n3$ n6=(n1−n3)−(n2−n4)

A=n5+n6

This would generate the common incorrect response of 25 rather than the correct response of 15.

An example of even greater complexity may be fraction subtraction with least common denominator and borrowing, as shown in the following example:

| Question: | 5 2/3 − 1 3/4 |
|---|---|
| Intermediate step: | 5 8/12 − 1 9/12 |
| Intermediate step: | 4 20/12 − 1 9/12 |
| Answer: | 3 11/12 |

There are several primitives that must be understood in order to solve this problem, including, but not limited to, simple subtraction, multiplication to least common denominator, borrowing, and numerator and denominator conversion. Some of these primitives are themselves complex primitives which have component primitives that may be tested for if the individual being tested responds incorrectly enough times to warrant testing of that particular primitive.

This question may have the following constraints, where n1 is the integer portion of the minuend, n4 is the integer portion of the subtrahend, n2 is the numerator in the fractional portion of the minuend, n3 is the denominator in the fractional portion of the minuend, n5 is the numerator in the fractional portion of the subtrahend, and n6 is the denominator in the fractional portion of the subtrahend:

n1>n4 n2×n6<n3×n5 n2<n3 n5<n6 n3≠n5 n1<10

1 cm(n3,n6)≠10 where 1 cm represents the least common multiple of the argument.

The question may be initialized by a random choosing of n1 through n6 as follows, subject to the previously chosen constraints:

random(n1,n2,n3,n4,n5,n6).

Thus, the process for generating the question and correct answer, A, may be:

P1=A=[n1 n2/n3]−[n4 n5/n6] (initial question)

n7=1 cm(n3,n6)

n8=n2×n7/n3 n9=n5×n7/n6 p2=[n1 n8/n7]−[n4 n9/n7] (intermediate step)

n10=n1−1 n11=n8+n7 p3=[n10 n11/n7]−[n4 n9/n7] (intermediate step)

n12=n10−n4 n13=n1−n9 n14=gcf(n13,n7)

Additionally,

If n14=1 then

A=n12 n13/n7 (can not be reduced)

else n15=n13/n14 n16=n7/n14

A=n12 n15/n16 (reduced form)

Figure 5:
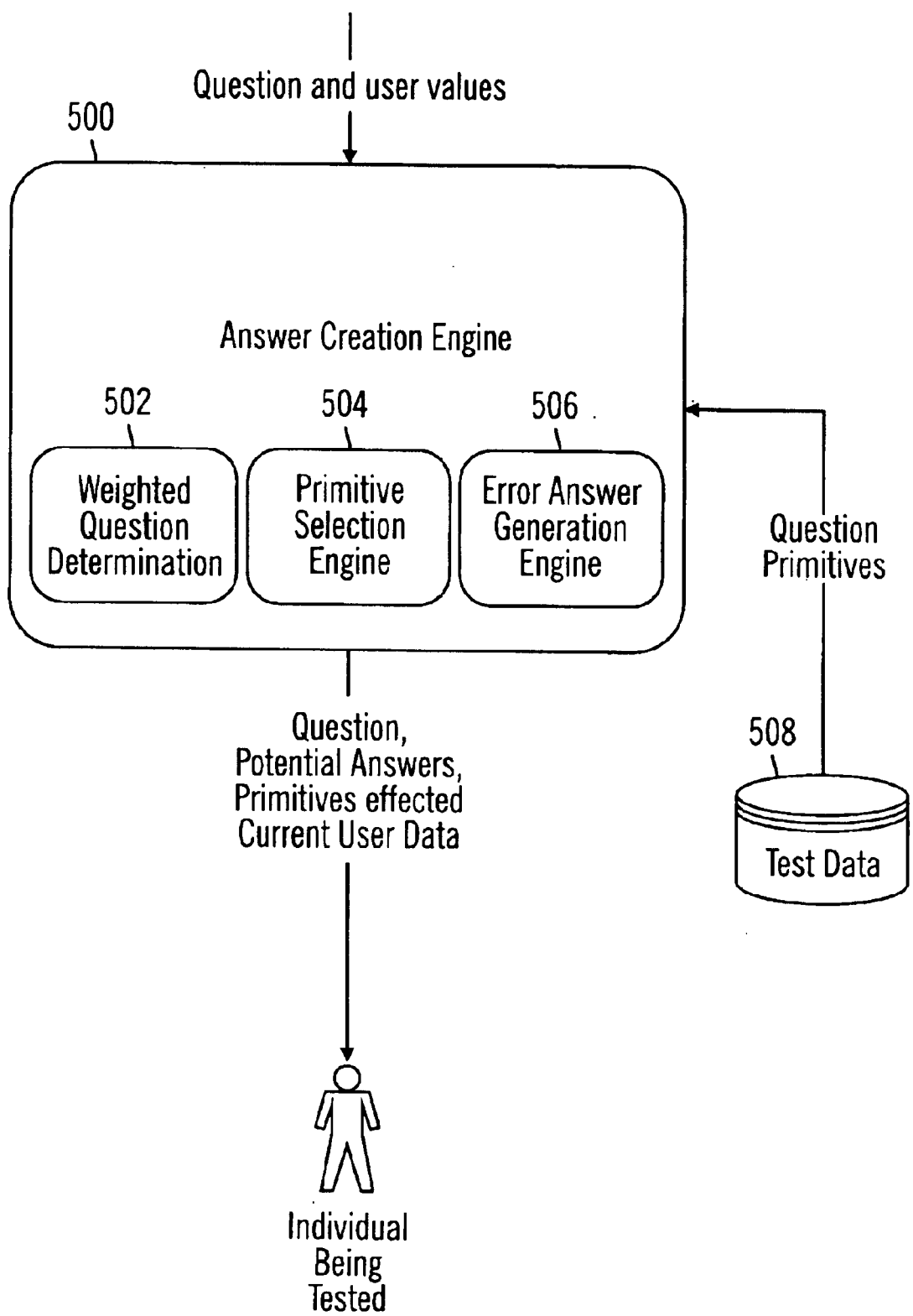
FIG. 5 is a diagram of an answer creation engine according to an embodiment of the present invention.

Details of an answer creation engine 500 according to an embodiment of the present invention are shown in FIG. 5. The answer creation engine 500 may use a question created by a question creation engine and user data generated by a test establishment engine to create answers to be presented to an individual being tested. The answer creation engine 500 may comprise three sub-engines that determine the answers to be presented to an individual being tested. A first of these sub-engines may be a weighted answer determination engine 502. This sub-engine may evaluate potential primitives contained in a system database 508 for the question, giving greater weight to some primitives over others based on user data as well as other data, including, but not limited to, aggregate testing information and psychographic and demographic data supplied by the user. A second of these sub-engines may be a primitive selection sub-engine, which, using information obtained from a previous weighted answer determination, may then select appropriate primitives. The system may determine that a check for carelessness should be made. In this case, the system will generate a solution based on misapplication of a constraint. Once the primitives have been selected, control may transfer to an error answer generation sub-engine 506. This sub-engine may create appropriate errors by algorithmically misapplying the selected primitives or by misapplying known and mastered primitives. Then, all possible answers associated with the question may be presented to the individual being tested for response.

Possible answers to the question may be grouped in a fashion such that the individual being tested may be probed for even more information. For example, groupings may include, but are not limited to, normal probes, probes to test carelessness, focused probes to test carelessness, and focused probes to test specific errors. These grouping may take the following forms:

a, e1, e2, e3, n—normal probe: correct answer, three known errors, none of the above å, e1, e2, e3, n—probe to test carelessness: misapplication of known and mastered primitives, three errors, none of the above a, å—focused probe to test carelessness: correct answer, misapplication of known and mastered primitives a, ei, n—focused probe to test specific error: correct answer, known error, none of the above Errors may also be generated by misapplying primitives. For example, referring to an example given above, 5⅔−1¾, a typical misapplication of a primitive when solving this question is as follows:

5⅔−1¾

5 8/12−1 9/12

4 18/12−1 9/12 (incorrect fraction conversion)

3 9/12

3¾

Using the notation previously used for this example, an error E may be generated as follows:

P1=A=[n1 n2/n3]−[n4 n5/n6] (initial question)

n7=1 cm(n3,n6)

n8=n2×n7/n3 n9=n5×n7/n6 p2=[n1 n8/n7]−[n4 n9/n7] (intermediate step)n10=n1−1 n11=n8+10 p3=[n10 n11/n7]−[n4 n9/n7] (intermediate step)

n12=n10−n4 n13=n11−n9 (constraints would ensure n11>n9)
n14=gcf(n13,n7)
Additionally,
If n14=1 then
E=n12 n13/n7
else
n15=n13/n14
n16=n7/n14
E=n12 n15/n16

Other types of errors may also be generated. For example, the system may support time dependencies to augment various weighting algorithms used in the weighting processes. Thus, if an individual being tested takes too much time to answer a question, an error may be generated.

Figure 6:
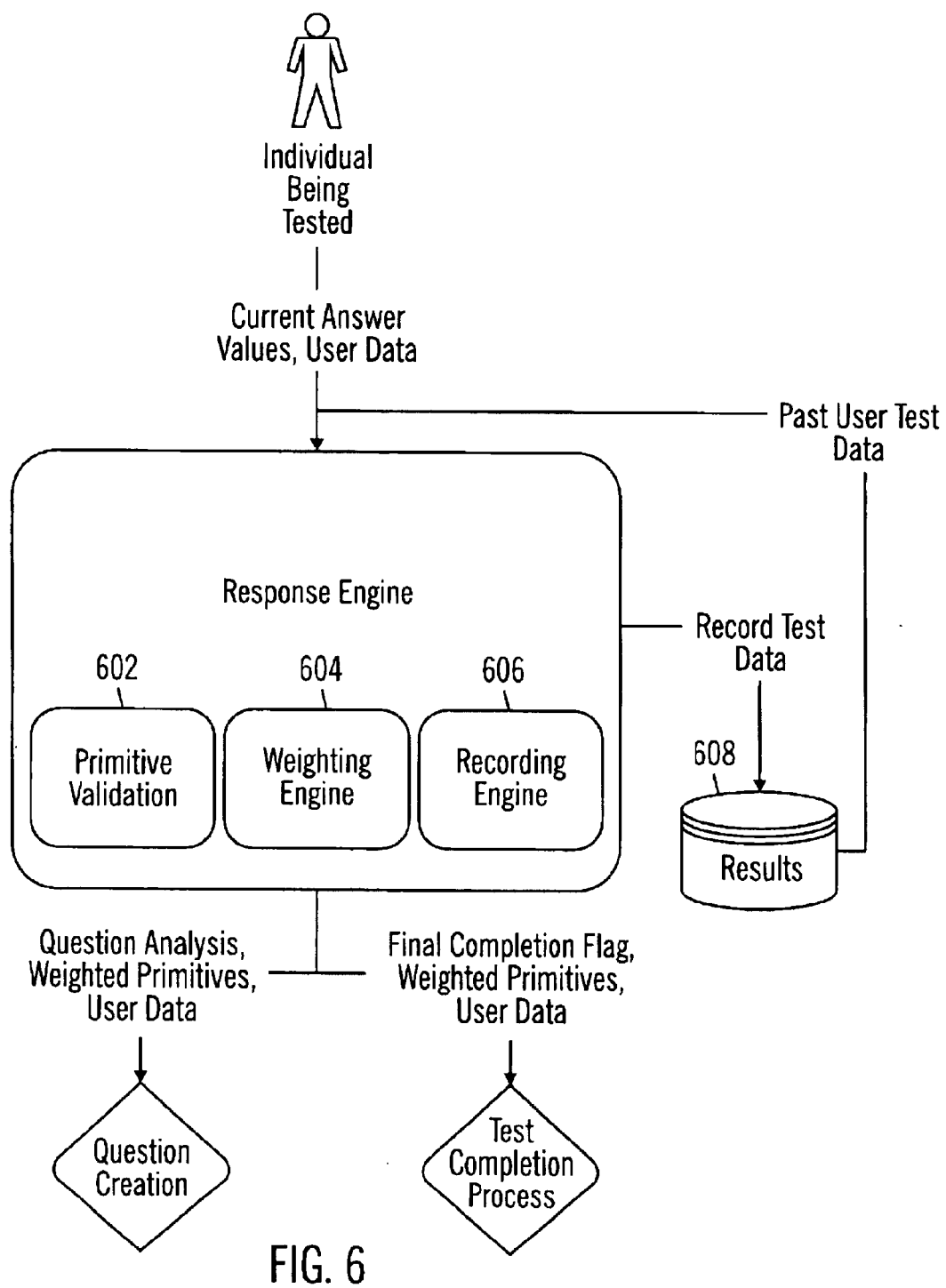
FIG. 6 is a diagram of a response engine according to an embodiment of the present invention.

A typical process associated with a response from an individual being tested is shown in FIG. 6. A response engine 600 may include three sub-engines. A first of these sub-engines, a primitive validation sub-engine 602, may validate a selection by an individual being tested as either correct or incorrect. If incorrect, a primitive associated with the answer may be located and, based on a number of variables associated with the response by the individual being tested, a weighting may be associated with the answer by an answer weighting engine 604. This answer may be used to modify the primitive's valuation. This information may then be recorded by a recording engine 606 into a results database 608, and may be used in an analysis of the individual being tested. This information may also become part of aggregate data used to adjust and modify adaptive portions of a system database. The response engine 600 may also to determine if another question should be generated, or if an individual being tested has completed the testing, typically by monitoring test-terminating thresholds and terminating a test if such thresholds have been met or exceeded.

Figure 7:
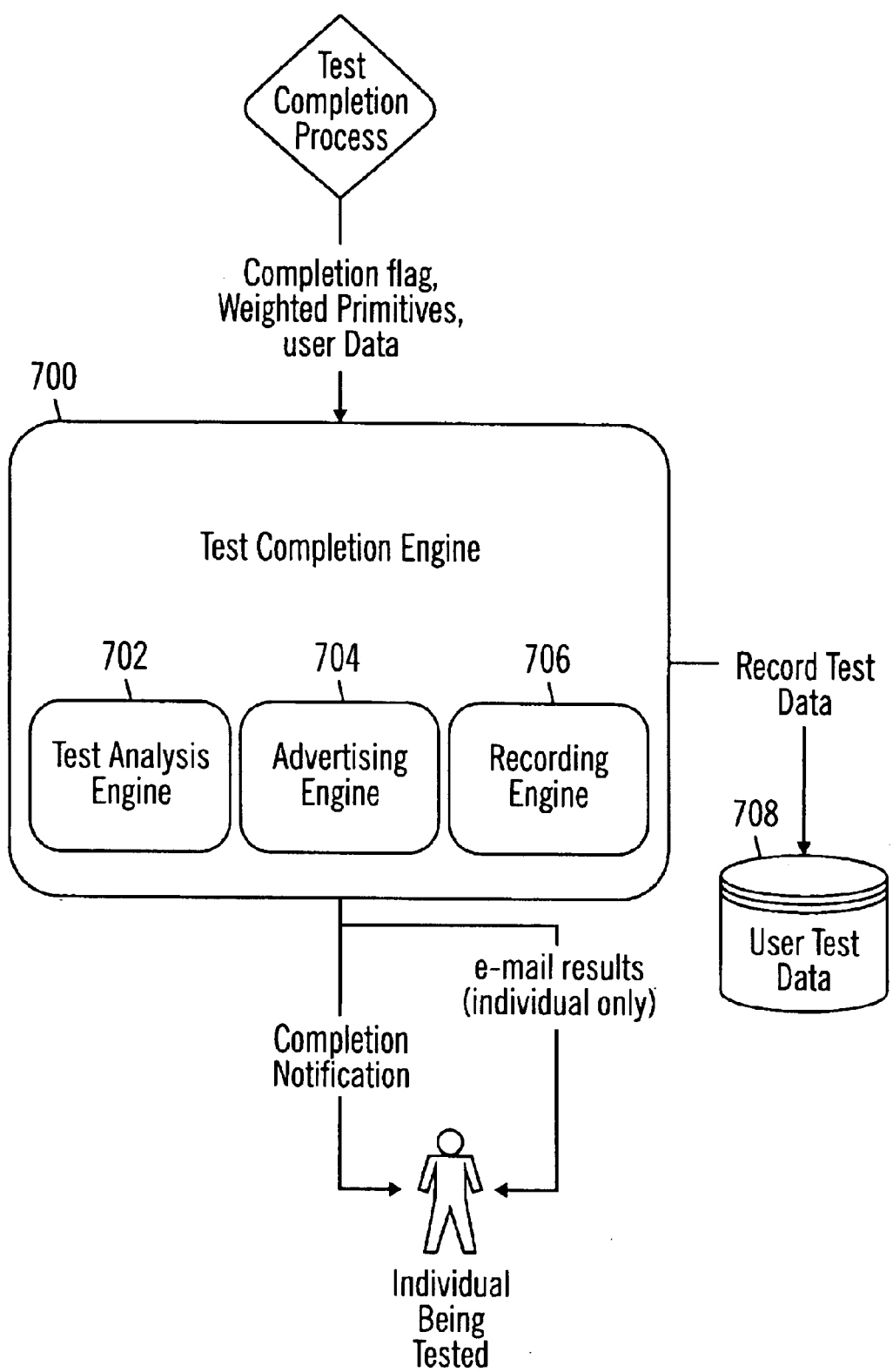
FIG. 7 is a diagram of a test completion engine according to an embodiment of the present invention.

A test completion engine 700 is shown in FIG. 7. If the system is used in a closed environment, results of the test may be compiled by the system by a test analysis engine 702 and displayed to the individual being tested. If the system is used in an open environment, possibly operating across networked computers, results may not be displayed to the individual being tested immediately upon completion of the test. The test completion engine may process test statistics and other data and may determine the strengths, concerns and weaknesses of the individual being tested based on weighting of the primitives associated with the test. A recommended course of action may be presented by the system to an individual being tested. Alternatively, an advertising engine 704 may notify an individual being tested of products and tools available in the marketplace that may be used to correct deficiencies in the primitives requiring more study or work. A test recording engine 706 may record analysis and recommendations in a system database 708.

Figure 8:
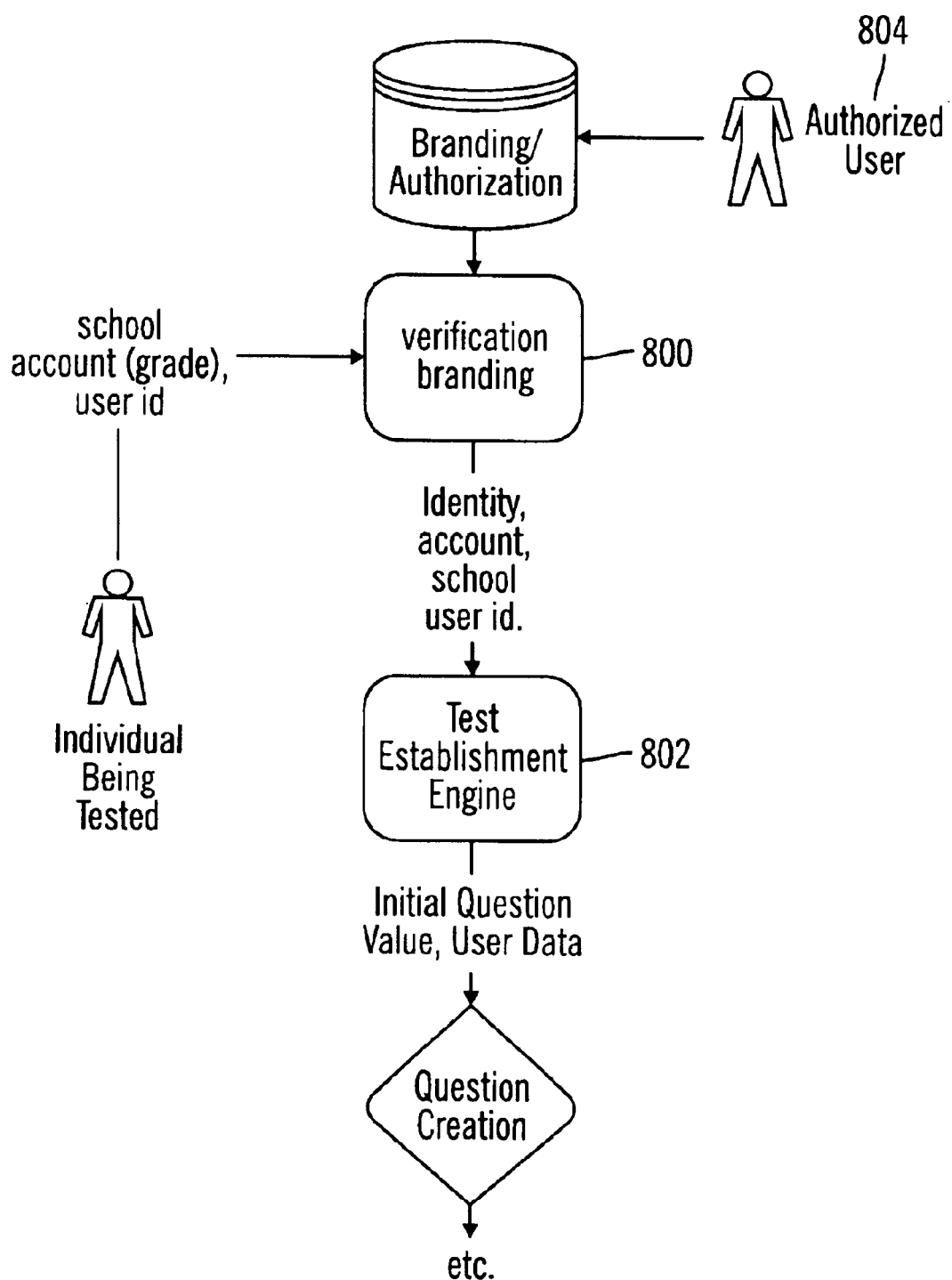
FIG. 8 is a diagram of a test completion engine according to another embodiment of the present invention.

FIG. 8 shows how the system may be utilized in a branded environment. A verification/branding interface 800 may be inserted at the start of the process, prior to test establishment 802. This interface may permit authorized users 804 to be added to the system. These users may be branded with a brand associated with, for example, testing centers, advanced education centers, schools and learning centers or libraries, so that an individual being tested may further identify resources available for correction of deficiencies based on the service being branded.

Figure 9:
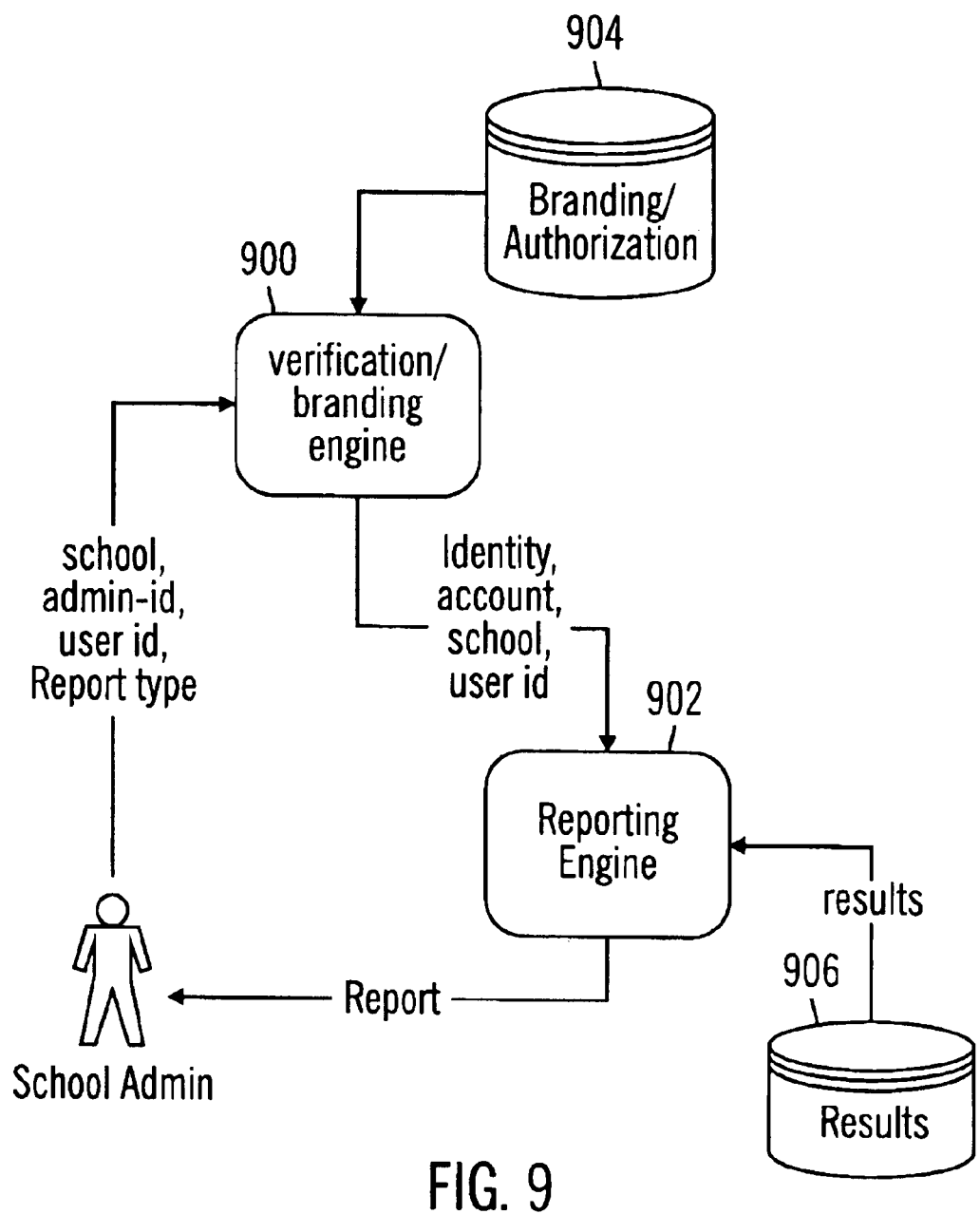
FIG. 9 is a diagram of a reporting engine according to an embodiment of the present invention.

FIG. 9 details the process of branded reporting. A verification and branding engine 900 may utilize branding and authorization data contained in a branding/authorization database 904 in providing information to a reporting engine 902. A reporting engine 902 may in turn combine this information with testing results obtained from a results database 906 in generating reports to appropriate persons or entities. A verification and branding engine 900 may also contain rules that permit users to view various reports based on pre-established access rights. As an example, a school might create varied levels of access for teachers, administrators and members of the Board of Education. Each group may have different levels of access to each report. The system may also support administration of special reports. These reports may be generated from an administration component, or the report generation services may be turned on by entries into an authorization database allowing authorized users access to these additional reports.

Figure 10:
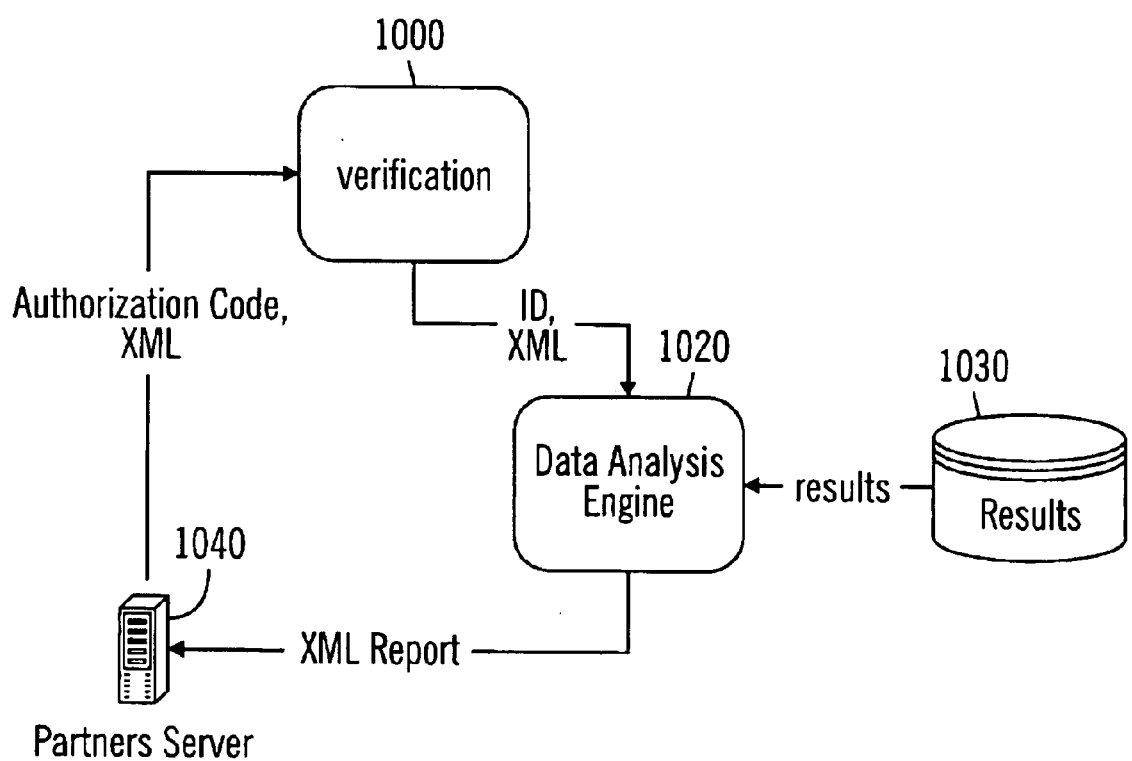
FIG. 10 is a diagram of a data analysis engine according to an embodiment of the present invention.

FIG. 10 shows a process to access aggregate data for resale. Here, a request from a partner 1040 for information from the system may be received. The request may be verified by a verification engine 1000. The request may be logged into the system and may be serviced by a request queue manager. The data analysis engine 1020 may perform the requested analysis based on standards established and maintained in a system database 1030 and the level of authority for the requestor to access this data. The data may then be returned to the partner who made the request.

Figure 11:
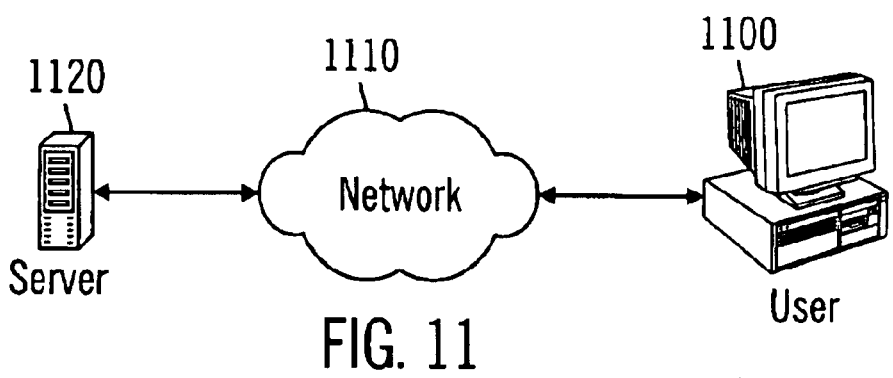
FIG. 11 is a diagram of an embodiment of the present invention implemented on a computer system.

The tables, databases, look-up tables, methods, systems, engines and functions described above with respect to entering individual information, generating questions and answers, and detecting responses, shown generally in FIGS. 1–10, as well as other embodiments of the invention, may be implemented in software residing on one or more computers as shown in FIG. 11. The computers may be implemented in a client/server fashion. The software implementing an embodiment of the invention may reside locally on a disk drive in a server 1120. A client 1100 may interface with a network 1110 over which test information is sent and received by the server 1120. Both the client 1100 and server 1120 may be personal computers such as those that are currently in use in schools and industry and are well-known in the art. The network 1110 may be a local area network (LAN) or a wide area network (WAN), which are also well-known in the art. An individual being tested may utilize the system by accessing the server 1120 via the client 1100 hardware.

Figure 12:
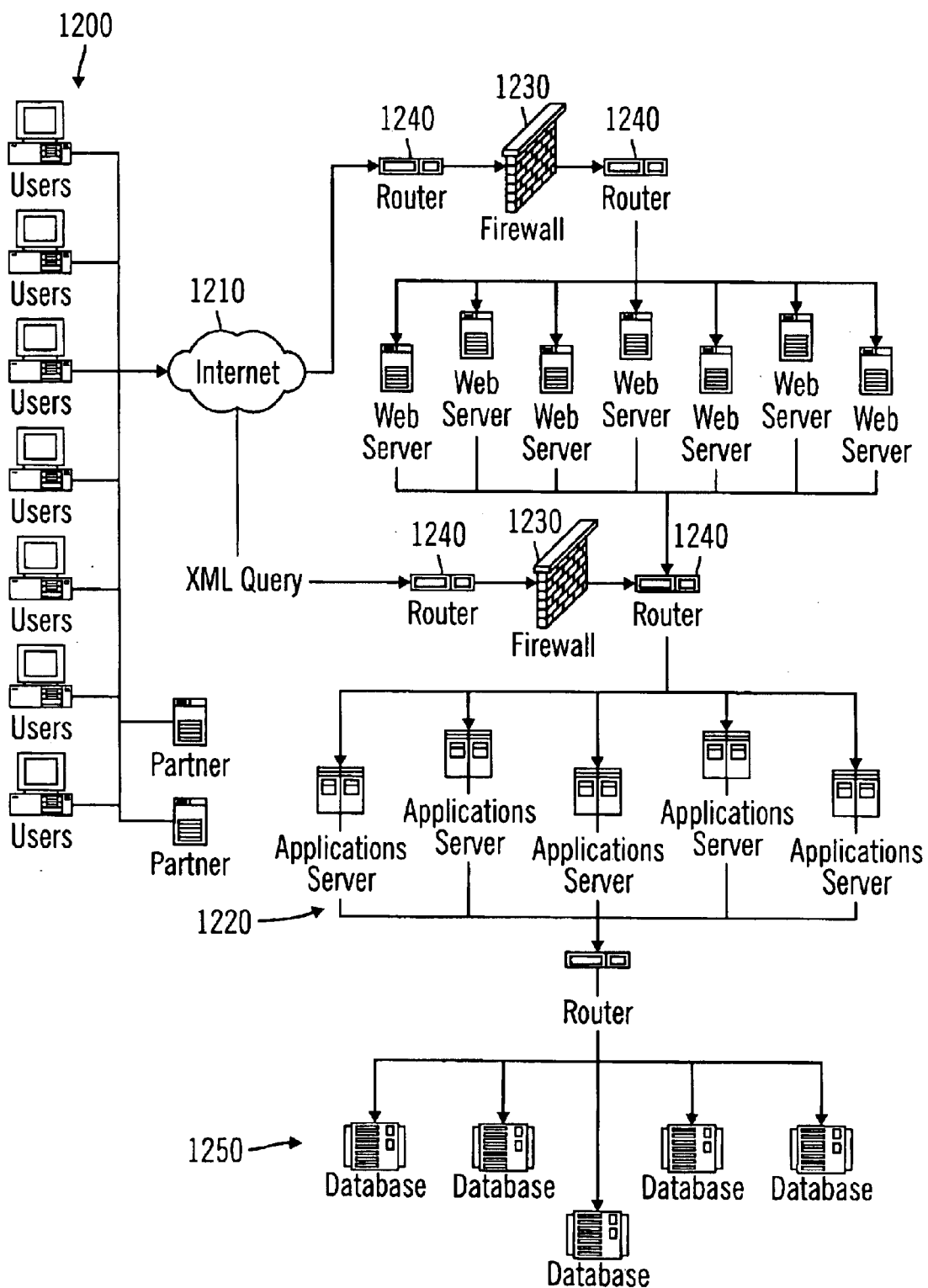
FIG. 12 is a diagram of an embodiment of the present invention implemented over the Internet.

FIG. 12 shows how the tables, databases, look-up tables, methods, systems, engines and functions described above with respect to entering individual information, generating questions and answers, and detecting responses, shown generally in FIGS. 1–10, as well as other embodiments of the invention, may be implemented in software residing on one or more computers utilizing the Internet. An individual being tested may access the software by a personal computer 1200 making an XML or other structured query through the Internet 1210. The software may reside on an application server 1220, which is connected to typical components well-known in the art, such as firewalls 1230, routers 1240, and databases 1250.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A method for processing questions and responses, comprising:

providing a first question based on data given by an individual;

providing a plurality of answers related to the first question, wherein at least one of the plurality of answers is an incorrect answer based on misapplication of a primitive;

presenting the first question and the related plurality of answers to the individual;

detecting a response to the first question from the individual; and providing a second question based on at least one primitive misapplied by the individual in the response to the first question;

providing a plurality of answers related to the second question, wherein at least one of the plurality of answers is an incorrect answer based on misapplication of a primitive;

presenting the second question and the related plurality of answers to the individual;

detecting a response to the second question from the individual; and providing a third question based on at least one primitive misapplied by the individual in the response to the second question.

2. The method of claim 1, wherein providing a first question further comprises requesting data regarding an individual; and generating the question based on the data.

3. The method of claim 1, wherein one of the plurality of answers is a correct answer to the question.

4. The method of claim 1, further comprising creating and presenting further questions and pluralities of answers to the individual based on the response from the individual.

5. The method of claim 2, further comprising incrementing a counter if an incorrect answer is chosen by the individual.

6. The method of claim 5, further comprising taking an action if the counters exceed a threshold and taking another action if the counters do not exceed the threshold.

7. The method of claim 4, further comprising determining from the responses from the individual at least one primitive the individual does not understand.

8. The method of claim 7, wherein advertising information responsive to the at least one primitive the individual does not understand is presented to the individual.

9. The method of claim 1, wherein brand information is presented to the individual for identifying a brand of resource available to the individual.

10. The method of claim 1, wherein providing a question, providing a plurality of answers related to the question, presenting the questions and the plurality of answers to an individual, and detecting a response is implemented in software.

11. The method of claim 10, wherein the software resides on at least one computer.

12. The method of claim 11, wherein the at least one computer is networked.

13. The method of claim 10, wherein the software is accessed over the Internet.

14. A system for processing questions and responses, comprising:

a test establishment engine for gathering data and establishing a topic;

a question creation engine for creating at least one first question using information gathered by the test establishment engine;

an answer creation engine for creating a plurality of answers corresponding to each first question, wherein at least one of the plurality of answers for each first question is an incorrect answer based on misapplication of a primitive;

a presentation engine for presenting the first each question and the corresponding plurality of answers to an individual;

a response detection engine for detecting responses from the individual to each first question; and wherein the question creating engine also operates for creating a at least one second question based on at least one primitive misapplied by the individual in at least one detected response to at least one first question;

wherein the answer creation engine also operates for creating a plurality of answers corresponding to each second question, wherein at least one of the plurality of answers for each second question is an incorrect answer based on misapplication of a primitive;

wherein the presentation engine also operates for presenting the second question and the related plurality of answers to the individual;

wherein the response detection engine also operates for detecting a response to the second question from the individual; and wherein the question creating engine also operates for providing a third question based on at least one primitive misapplied by the individual in at least one detected response to at least one second question.

15. The system of claim 14, wherein the test establishment engine gathers information regarding the individual.

16. The system of claim 14, wherein the system will create and present further questions and pluralities of answers to the individual based on the response from the individual.

17. The system of claim 15, wherein a counter is incremented if an incorrect answer is chosen by the individual.

18. The system of claim 17, wherein an action is taken if the counter exceeds a threshold and another action is taken if the counter does not exceed the threshold.

19. The system of claim 16, further comprising a determination engine, wherein the system determines from the responses from the individual what the individual does not know.

20. The system of claim 19, wherein advertising information responsive to what the individual does not know is presented to the individual.

21. The system of claim 14, wherein the system supports branding and authorization.

22. The system of claim 14, wherein the system is implemented on a computer system.

23. The method of claim 22, wherein the computer system is networked.

24. The method of claim 1, wherein providing a plurality of answers comprises:

selecting a primitive;

calculating an answer to the question using the primitive in an incorrect manner; and including the calculated answer among the plurality of answers.

25. The system of claim 14, comprising:

a selector for selecting a primitive; and a calculator for calculating an answer to the question using the primitive in an incorrect manner.

26. The method of claim 6, wherein the action taken when a threshold is exceeded comprises providing a question having at least one answer based on at least one previously misapplied primitive.

27. The system of claim 18, wherein the action taken when a threshold is exceeded comprises providing a question having at least one answer based on at least one previously misapplied primitive.

28. The method of claim 1, wherein providing a first question comprises selecting a question generating algorithm from a plurality of question generating algorithms and performing the selected algorithm on a computer.

29. The method of claim 28, wherein providing a first question further comprises selecting at least one variable used in the performance of the selected algorithm.

30. The method of claim 29, wherein selecting at least one variable comprises randomly generating the at least one variable.

31. The method of claim 1, wherein providing a plurality of answers related to the first question comprises generating on a computer at least one valid incorrect answer for the question by misapplying at least one primitive associated with the selected question algorithm in a solution to the question.

32. The method of claim 31, wherein providing a plurality of answers related to the first question further comprises generating on a computer a correct answer by correctly solving the first question.

33. A method for processing questions and responses, comprising:

providing a plurality of question algorithms for generating questions, each question algorithm is associated with at least one primitive;

generating a question by selecting a question algorithm from the plurality of question algorithms and performing the selected question algorithm;

generating at least one valid incorrect answer for the question by misapplying at least one primitive associated with the selected question algorithm in a solution to the question; generating a correct answer by correctly solving the question;

providing data for displaying the question, the at least one valid incorrect answer and the correct answer;

detecting a response to the displayed question and answers from the individual;

generating at least one further question in the event that the detected response comprises the individual's selection of one of the valid incorrect answers, the at least one further question being generated by selecting a further question algorithm associated with at least one primitive that was misapplied to generate the valid incorrect answer selected by the individual, and performing the selected further algorithm.

34. A method of claim 33, further comprising:

incrementing at least one count value in the event that the detected response comprises the individual's selection of one of the valid incorrect answers, wherein the at least one count value is a count value associated with each primitive that was misapplied to generate the valid incorrect answer selected by the individual;

detecting whether the count value for a primitive has exceeded a predetermined threshold value for that primitive; and if the count value has exceeded the predetermined threshold, then generating at least one further question by selecting a further question algorithm associated with one or more primitives that were not associated with the question algorithm of the first question.

35. A method of claim 33, further comprising detecting a terminating event and stopping generation of further questions in response to the detection of the terminating event.

36. A method of claim 35, wherein the terminating event comprises the generation of a final question.

37. A method of claim 35, wherein the terminating event comprises the expiration of a predetermined time period.

38. A method of claim 33, further comprising providing a plurality of topics, each topic having a plurality of associated question algorithms.

39. A method of claim 38, wherein providing a plurality of question algorithms comprises identifying a topic from the plurality of topics and providing the plurality of question algorithms associated with the identified topic.

40. A method of claim 39, wherein identifying a topic comprises receiving input from the individual identifying a selected topic from the plurality of topics.

* * * * *